Figure 1:
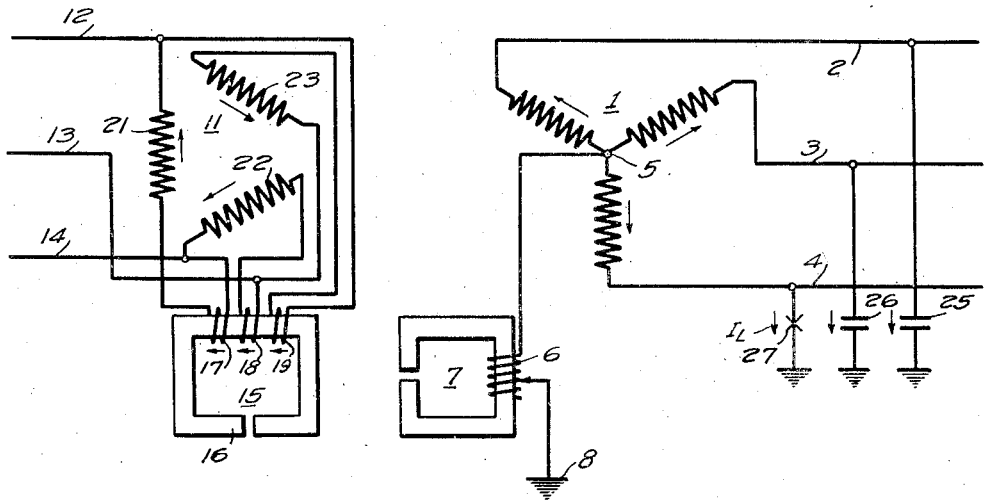

March 31, 1942.  R. D. EVANS  2,277,860
GROUND FAULT NEUTRALIZER
Filed July 12, 1941

WITNESSES:
E. A. McCloskey
Nw. C. Groome

INVENTOR
Robert D. Evans.
BY Franklin E. Hardy
ATTORNEY

Patented Mar. 31, 1942

2,277,860

UNITED STATES PATENT OFFICE 2,277,860

GROUND FAULT NEUTRALIZER

Robert D. Evans, Swissvale, Pa., assignor to Westinghouse Electric & Manufacturing Company, East Pittsburgh, Pa., a corporation of Pennsylvania Application July 12, 1941, Serial No. 402,177

6 Claims. (Cl. 171—97)

My invention relates to improvements in the protection of alternating current electric power systems and particularly to transmission systems employing ground fault neutralizers of the general character of those tuned to the capacitance to ground of the ungrounded parts of an alternating current circuit commonly called Petersen coils. In such systems, a grounding reactor is provided that is connected between a neutral point of the system and ground and is so dimensioned electrically that upon the grounding of one phase conductor of the system, a current flows through the grounding reactor which substantially neutralizes the resultant capacity current flowing to ground from the ungrounded phase conductors of the system thus extinguishing the ground fault current.

With this arrangement, the neutral point of the system that is grounded through the ground fault neutralizer assumes a voltage above ground corresponding to the normal line-to-ground voltage of the system. This necessitates the use of fully insulated transformers, that is, transformers provided with insulation, in the vicinity of the neutral of the transformer, between the low-voltage winding and the high-voltage winding and between the high-voltage winding and ground that is capable of withstanding a voltage stress corresponding to the normal line-to-ground voltage. Such transformers are also provided with insulation in the vicinity of the line terminals that is capable of withstanding a voltage-to-ground equal to the normal line-to-line voltage.

For very high working voltages, this means a heavy expenditure for insulation. It also limits the application of ground fault neutralizers to systems whose neutral points are insulated from ground for at least the line-to-neutral or star voltage of the system. Since there are many high-voltage systems in which the transformers employed have an insulation at the neutral that is below the above-stated requirements, it has not been possible in the past to equip these systems with a ground fault neutralizer of the character above indicated, except by reinsulating the transformer.

An alternative of the above arrangement is the use of a special grounding transformer for suppressing the fault charging current-to-ground in high-voltage systems by connecting the neutral point of a transformer connected to the system directly to ground without any inserted inductive device between the neutral and ground, and to so load another polyphase winding of the transformer that the resultant current flowing from the neutral point of the transformer to ground has substantially the same order of magnitude as the earth fault current-to-ground. In such transformers the additional winding in three-phase installations is connected as a delta winding, the circuit of which is closed by a suitable inductive device. Such an arrangement has some disadvantages because in the event of a ground fault from a system conductor, the voltage on the ungrounded phases of the transformer is increased. Because of this fact, it is necessary to work the transformer iron normally at low flux density which is inefficient and uneconomical.

It has also been proposed to provide a combination of the grounding transformer system and the tuned reactor system to provide a special grounding transformer and reactor combination which, in effect, draws part of the grounding current through the secondary winding of the transformer and part through the primary or high-voltage winding of the transformer. By such an arrangement, the voltage at the neutral point may be kept below the value which it would have if a single reactor were provided between the neutral point and ground that is tuned to the capacity current-to-ground of the system.

There are two outstanding objections to this proposed special grounding transformer and reactor combination. These are, first, that the grounding transformer provides reactance in one phase of the secondary or low-voltage winding of the transformer which introduces a dissymmetry of the three-phase voltages that is objectionable for normal operation of the system if the secondary winding is carrying load. Secondly, the voltage drop across the secondary winding will be greater than the normal phase-to-phase voltage of the secondary winding if the voltage between the neutral point of the system and ground is greater than 57% of the zero sequence voltage between the three-phase conductor terminals and ground. Ordinarily, secondary windings are fully insulated but this does not mean that they are capable of handling voltages of the order that are possible due to ground faults occurring on a system.

It is an object of my invention to provide ground fault neutralizing means for effecting the desirable characteristic of limiting the rise in the voltage of the neutral point of the system to a much lesser extent than would be effected by a tuned reactor between the neutral point and ground, without the two above-recited objections which result from the use of the combined neutral point grounding reactor and special grounding transformer described above.

More specifically, it is an object of the invention to provide a ground fault neutralizer equipment which employs both a reactor between the neutral point of the system and ground and a zero sequence reactor in a delta connected circuit of the transformer. In this arrangement of the apparatus, the first or single-phase reactor may be connected between the neutral point of a Y-connected transformer primary winding of a three-phase system, and the zero sequence reactor may be connected in the delta connected secondary windings of the transformer so that no third set of windings are necessary.

Figure 2:
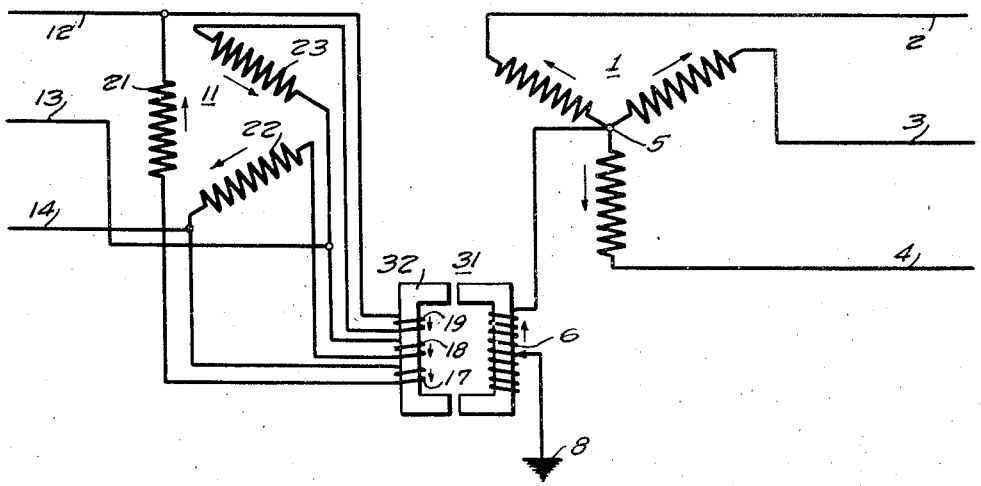

Other objects and advantages of the invention will be apparent from the following description of certain preferred embodiments of the invention, reference being had to the accompanying drawing, in which:

Figure 1 is a diagrammatic view of circuits and apparatus illustrating one preferred embodiment of the invention; and Fig. 2 is a diagrammatic view illustrating circuits and apparatus showing a second preferred embodiment of the invention.

Referring to Figure 1, a transformer is provided having a three-phase high-voltage winding 1, connected to circuit conductors 2, 3 and 4 of an alternating current transmission system, the neutral point 5 of the Y being connected through the winding 6 of a single phase reactor 7 to ground at 8 very much in the same manner as in the use of a tuned reactor or Petersen coil excepting that the value of reactance is less. The transformer is also provided with low-voltage windings 11 connected in delta relation with each other and to the circuit conductors 12, 13 and 14, the windings 1 and 11 being inductively related in a well known manner. A zero sequence reactor 15 is provided having a magnetic core 16 upon which three windings 17, 18 and 19 are provided connected respectively in series with the separate phase windings 21, 22, and 23 of the three-phase winding group 11 so that each of the zero sequence reactor windings is in series with one single phase winding only of the secondary winding 11 between the phase conductors to which that phase winding is connected.

It will be appreciated that the zero sequence reactor 15 is a reactor having three windings connected in a three-phase circuit in such manner that substantially no resultant flux is produced by positive or negative sequence currents, that is, by the normal flow of power circuit current, but a considerable flux is produced by zero sequence currents thus causing a high reactance to resist the flow of such currents. This arrangement, therefore, introduces negligible reactance in the transformer from the source side to the load side of the system, but does introduce high reactance in the zero sequence circuit. Part of the zero sequence current will be consumed in producing a voltage drop in the single phase reactor 7 and part in the zero sequence reactor 15 either part of which may be employed to give the desired fault neutralizing action. If we adjusted the single phase reactor 7 to take all of the zero sequence potential, the maximum value of insulation of the transformer windings 1 would be required while, conversely, if all of the zero sequence potential is used in the reactor 15, the minimum insulation from neutral-to-ground of the transformer windings 1 is required. To accomplish the latter result, a large reactor 15 would be required. By properly proportioning the zero sequence potential between the two reactors 7 and 15, it is possible to limit the voltage between the neutral point 5 and ground 8 to any predetermined value which may be selected by the amount of insulation provided in the winding 1 of the transformer. By using the maximum permissible voltage drop from the neutral point of the system to ground, consistent with the insulation provided in the high-voltage transformer winding, the smallest capacity of grounding reactor is required.

Referring to Fig. 1, the capacitance between conductor 2 and ground is represented diagrammatically by condenser 25 and the capacitance to ground from conductor 3 is represented by capacitance 26, a similar capacitance normally existing between conductor 4 and ground. Upon the occurrence of a fault at 27 between conductor 4 and ground, zero sequence current will flow from conductor 4 to ground, as indicated by the arrows, up through the single phase reactor 6 to the neutral point 5 and outwardly over the three-phase conductors, as indicated by the arrows. Capacity current will also flow from conductors 2 and 3 to ground and back to the system through the fault at 27. It is desirable, in order to extinguish the arc, that the value of the zero sequence phase current flowing through the fault at 27 be equal in value to the capacity current flowing from conductors 2 and 3 to ground and back to conductor 4 through this fault, and be a lagging current capable of neutralizing the leading or capacity current. In the tuned neutral grounding reactor scheme of the prior art, this result is obtained by providing a value of reactance in the reactor 7 that will give the desired value of lagging current that is, by tuning the reactor 7 to the capacity of the ungrounded part of the system.

In accordance with the present invention, a value of reactance in the reactor 7 is provided that is less than the reactance required to provide this current, the remaining portion of the desired reactance being effected through the zero sequence reactor in which the three coupled windings 17, 18 and 19 are in series respectively with the three-phase, delta-connected windings 21, 22 and 23 that are inductively related to the windings 1 so that a portion of the zero sequence current flowing through the fault at 27 is determined by the value of the reactor 7, the remaining portion being determined by the value of the reactor 15. Either device may be adjusted or tuned so that the total effect gives the desired reactance value. It is usually preferable to tune the reactor 7, since this may be done by changing taps on the single winding 6 only instead of on the three windings 17, 18 and 19 of the zero sequence reactor 15.

The embodiment of the invention illustrated in Fig. 2 corresponds in principle to that illustrated in Fig. 1, the difference being that the two reactor devices of Fig. 1 have been combined into a single device 31 so that the several windings 17, 18 and 19 of the zero sequence reactor and the winding 6 of the single phase reactor are wound upon the same core structure 32. The four arrows opposite the four windings in Fig. 2 indicate that the fluxes produced by the several windings caused by the flow of zero sequence current therethrough should all be in the same direction about the magnetic circuit. By the structure shown in Fig. 2, the cost of the equipment may be materially reduced in that a single reactance device is required instead of the two reactance devices shown in Fig. 1. The core structures forming the magnetic circuits in the several reactor devices may be provided with air gaps, the cores being arranged to saturate at particular values of current in accordance with the design requirements in particular cases.

It will be apparent to those skilled in the art that modifications in the circuits and apparatus illustrated and described may be made within the spirit of my invention and I do not wish to be limited otherwise than by the scope of the appended claims.

I claim as my invention:

1. In combination, a polyphase alternating current electrical transmission system, a transformer connected to the system having inductively related delta connected and Y connected windings, a zero sequence reactor connected in series with the delta connected windings, a grounding reactor connected between the neutral point of the Y connected windings and ground and so dimensioned electrically that upon the occurrence of the grounding of one phase conductor of the system the voltage to ground from the neutral point of the system does not exceed a predetermined value which is materially less than the normal voltage to ground of a phase conductor of the system, said two reactors together providing on the occurrence of a ground on a phase conductor of the system a zero phase sequence lagging current for effectively suppressing the capacitance current to ground at the grounded point.

2. In combination, a polyphase alternating current electrical transmission system, a transformer connected to the system having inductively related delta connected and Y connected windings, a zero sequence reactor having a plurality of windings, one in series with each of the several delta connected windings, and coupled to offer a high resistance to the flow of zero sequence current through the delta connected windings while permitting the ready flow of balanced power current therethrough, a grounding reactor connected between the neutral point of the Y connected windings and ground and so dimensioned electrically that upon the occurrence of the grounding of one phase conductor of the system the voltage to ground from the neutral point of the system does not exceed a predetermined value which is materially less than the normal voltage to ground of a phase conductor of the system, said two reactors together providing, on the occurrence of a ground on a phase conductor of the system, a zero phase sequence lagging current for effectively suppressing the capacitance current to ground at the grounded point.

3. In combination, a polyphase alternating current electrical transmission system, a transformer connected to the system having inductively related delta connected and Y connected windings, a zero sequence reactor for introducing a high reactance to the flow of zero sequence current through the delta connected windings while offering a low reactance to the flow of balanced power current therethrough comprising an iron core about which is provided a separate winding for each of the delta connected windings, one such reactor winding being connected in series with one phase winding only between the phase conductors of the delta connection, the several reactor windings being closely coupled, wound in the same direction, and similarly connected to the several phase windings, a grounding reactor connected between the neutral point of the Y connected windings and ground and so dimensioned electrically that upon the occurrence of the grounding of one phase conductor of the system the voltage to ground from the neutral point of the system does not exceed a predetermined value which is materially less than the normal voltage to ground of a phase conductor of the system, said two reactors together providing, on the occurrence of a ground on a phase conductor of the system, a zero phase sequence lagging current for effectively suppressing the capacitance current to ground at the grounded point.

4. In combination, a polyphase alternating current electrical transmission system, a transformer connected to the system having inductively related delta connected and Y connected windings, a zero sequence reactor connected in series with the delta connected windings, a grounding reactor connected between the neutral point of the Y connected windings and ground and so dimensioned electrically that upon the occurrence of the grounding of one phase conductor of the system the voltage to ground from the neutral point of the system does not exceed a predetermined value which is materially less than the normal voltage to ground of a phase conductor of the system, a single magnetic core circuit for the windings of said zero sequence reactor and the windings of said grounded reactor, the several windings being so positioned thereon that the zero sequence current flowing in the several windings at one time will produce magnetic forces in the same direction in the core circuit, said two reactors together providing on the occurrence of a ground on a phase conductor of the system a zero phase sequence lagging current for effectively suppressing the capacitance current to ground at the grounded point.

5. In combination, a polyphase alternating current electrical transmission system, a transformer connected to the system having inductively related delta connected and Y connected windings, a zero sequence reactor having a plurality of windings, one in series with each of the several delta connected windings, and coupled to offer a high resistance to the flow of zero sequence current through the delta connected windings while permitting the ready flow of balanced power current therethrough, a ground reactor connected between the neutral point of the Y connected windings and ground and so dimensioned electrically that upon the occurrence of the grounding of one phase conductor of the system the voltage to ground from the neutral point of the system does not exceed a predetermined value which is materially less than the normal voltage to ground of a phase conductor of the system, a single magnetic core circuit for the windings of said zero sequence reactor and the windings of said grounded reactor, the several windings being so positioned thereon that the zero sequence current flowing in the several windings at one time will produce magnetic flux forces in the same direction in the core circuit, said two reactors together providing on the occurrence of a ground on a phase conductor of the system a zero phase sequence lagging current for effectively suppressing the capacitance current to ground at the grounded point.

6. In combination, a polyphase alternating current electrical transmission system, a transformer connected to the system having inductively related delta connected and Y connected windings, a zero sequence reactor for introducing a high reactance to the flow of zero sequence current through the delta connected windings while offering a low reactance to the flow of balanced power current therethrough comprising a separate winding for each of the delta connected windings, one such reactor winding being connected in series with one phase winding only between the phase conductors of the delta connection, the several reactor windings being closely coupled, wound in the same direction, and similarly connected to the several phase windings, a grounding reactor connected between the neutral point of the Y connected windings and ground and so dimensioned electrically that upon the occurrence of the grounding of one phase conductor of the system the voltage to ground from the neutral point of the system does not exceed a predetermined value which is materially less than the normal voltage to ground of a phase conductor of the system, a single magnetic core circuit for the windings of said zero sequence reactor and the windings of said grounded reactor, the several windings being so positioned thereon that the zero sequence current flowing in the several windings at one time will produce magnetic flux forces in the same direction in the core circuit, said two reactors together providing on the occurrence of a ground on a phase conductor of the system a zero phase sequence lagging current for effectively suppressing the capacitance current to ground at the grounded point.

ROBERT D. EVANS.